Feb. 1, 1927.
V. DURAND, JR
1,616,308
GLASS MOLDING MACHINE
Filed Sept. 5, 1925
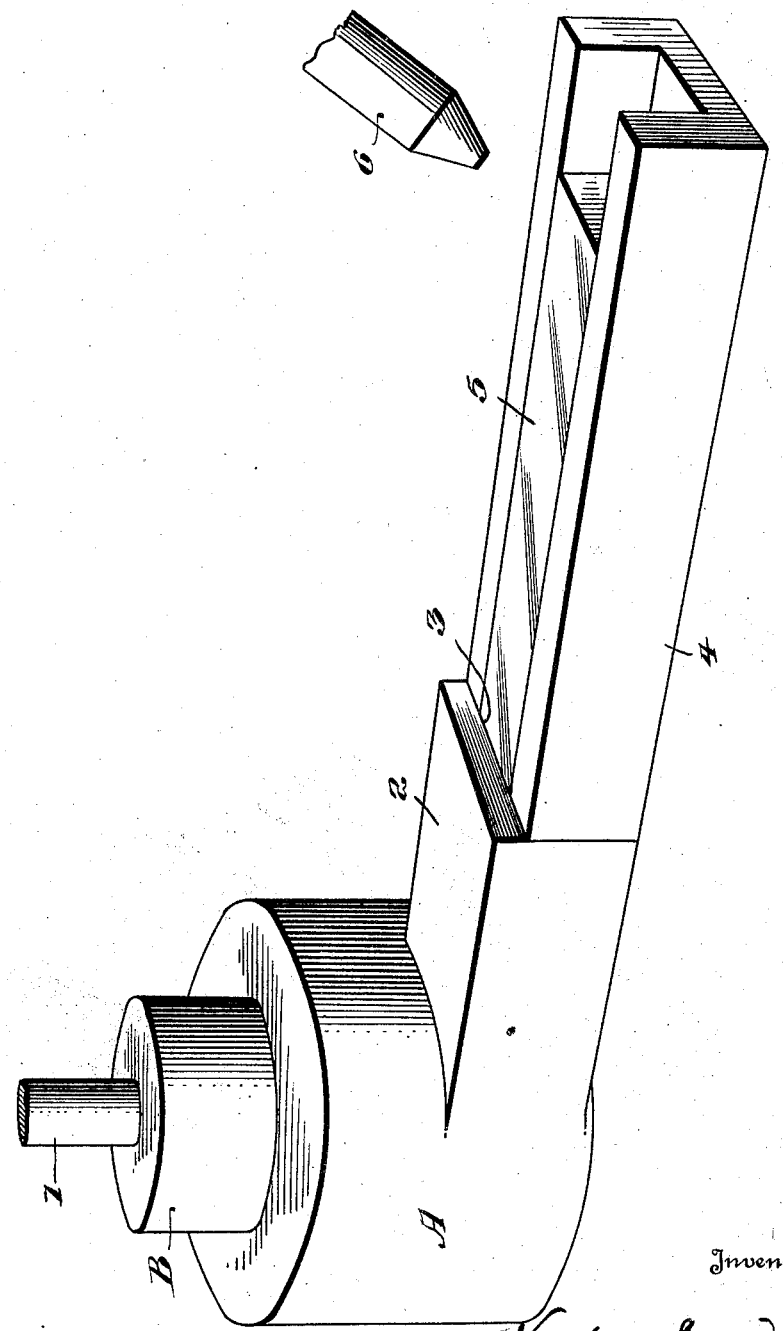

Patented Feb. 1, 1927.

1,616,308

UNITED STATES PATENT OFFICE.

VICTOR DURAND, JR., OF VINELAND, NEW JERSEY.

GLASS-MOLDING MACHINE.

Application filed September 5, 1925. Serial No. 54,785.

My invention relates to an improvement in glass molding machines.

The present invention is designed more particularly for molding towel-bars and the like in square, round, oblong and other cross-sectional forms.

Great difficulty has been encountered in the past in preventing bending, warping, and surface cracking. All this has been obviated in my present invention, which consists in a mold adapted to receive the molten glass, a plunger for forcing it out, and a trough of the shape of the article to be formed, out through which the glass is forced in the cross-sectional form and size of the trough itself.

The accompanying drawing is a view in perspective.

A, represents the mold; and B, is the plunger which fits the cylindrical inner wall of the mold; and 1, is a fragment of the handle of the plunger.

The numeral 2 represents the spout of the mold; and 3, is the outlet. A trough 4 of the form of the outlet 3 in cross-section is placed adjacent to the outer end of the spout 2, and the charge of glass 5 is forced out through this spout in a quantity approximately to fill the mold, so that the glass is really formed as it issues through the spout, and the form is preserved by feeding and during its passage through the trough 4. An air nozzle 6, of which one only of several is illustrated, is adapted to cool the glass as it feeds through the trough. In this way I have found the shape given the bar of glass at the nozzle is preserved perfectly by the shape of the trough, and by the time the completed bar fills, or approximately fills the trough, it is a completed and perfected article.

While other forms are not shown, it is obvious that these bars might be made either square as illustrated, oblong, round, or in fact in other cross-sectional forms. Thus in a very simple way provision is made for forming articles of this character simply, cheaply, and with a very high degree and percentage of profit, and with the handling and processing reduced to a minimum.

I claim:

The combination of a glass-receiving chamber, an outlet spout of the desired cross-sectional shape and form of the desired article, and a trough open on its upper side and of corresponding cross-section to the outlet adapted to receive the material and preserve its shape until it becomes set, and an air blast for cooling and chilling the material during its passage through the trough.

In testimony whereof I affix my signature.

VICTOR DURAND, JR.